United States Patent [19]
Karubian et al.

[11] Patent Number: 5,607,349
[45] Date of Patent: Mar. 4, 1997

[54] CARCASS CLEANING SYSTEM

[75] Inventors: Ralph K. Karubian, Los Angeles, Calif.; John A. Leamen, Omaha, Nebr.

[73] Assignee: Kentmaster Mfg. Co., Inc., Monrovia, Calif.

[21] Appl. No.: 416,036

[22] Filed: Apr. 3, 1995

Related U.S. Application Data

[63] Continuation-in-part of Ser. No. 234,684, Apr. 28, 1994, abandoned, and a continuation-in-part of Ser. No. 378,534, Jan. 25, 1995, Pat. No. 5,503,594.

[51] Int. Cl.$^6$ .................................................. A22C 17/08
[52] U.S. Cl. ............................................................ 452/173
[58] Field of Search ............................... 452/173, 71, 75, 452/77, 102, 103, 104; 15/321, 322, 344, 345, 353, 420, 246

[56] References Cited

U.S. PATENT DOCUMENTS

| | | | |
|---|---|---|---|
| Re. 26,950 | 9/1970 | Hays | 15/321 |
| 1,982,345 | 11/1934 | Kirby | 15/321 |
| 3,883,301 | 5/1975 | Emrick et al. | 15/321 |
| 4,074,387 | 2/1978 | Akato et al. | 15/322 |
| 4,649,594 | 3/1987 | Grave | 15/321 |
| 4,949,424 | 8/1990 | Shero | 15/321 |

FOREIGN PATENT DOCUMENTS 29570 of 1910 United Kingdom ..................... 15/420

*Primary Examiner*—Willis Little
*Attorney, Agent, or Firm*—Allan M. Shapiro

[57] ABSTRACT

As a carcass moves down the conveyor in a meat processing plant, it may carry contaminants from an earlier processing step. The carcass surface is sterilized, and the contaminants are removed by bringing a cleaning wand to the carcass surface. The wand has a vacuum mouth, an internal hot water spray and an external steam spray. The wand sprays a sterilizing hot water spray onto the surface within the confines of the mouth of the wand. The wand sprays steam onto the carcass surface adjacent the wand. The wand vacuums away the water, steam and contaminants.

20 Claims, 3 Drawing Sheets

CARCASS CLEANING SYSTEM

CROSS-REFERENCE

This application is a continuation-in-part of our prior applications, Ser. No. 08/234,684, filed Apr. 28, 1994 for "Carcass Cleaning System", now abandoned and Ser. No. 08/378,534, filed Jan. 25, 1995, now U.S. Pat. No. 5,503,594 the entire disclosures of which are incorporated herein by this reference.

FIELD OF THE INVENTION

This invention is directed to a carcass cleaning system where a manually positionable wand simultaneously applies a hot water spray within the wand and vacuums away the spray, together with a steam nozzle exterior to the wand for delivering steam to the carcass surface adjacent the wand.

BACKGROUND OF THE INVENTION

Animals are killed to produce commercial meat, such as beef, lamb and pork, and are hung on a conveyor so as to move along a processing line. On the conveyor, the killed hanging animal is gutted and skinned as early processing steps. The resulting carcass moves forward along the processing line, but may carry contamination on the surface of the carcass from earlier processing steps such as the process of hide removal where hair and mud can fall off onto the carcass. The contaminants may include feces and bacteria.

The present practice, which is mandated by the U.S. Department of Agriculture, is to cut off the surface material upon which the contamination lies. This requires individual handwork and results in loss of otherwise useful meat and/or fat material from the carcass.

The U.S. Department of Agriculture does not approve of washing down the contamination off of the carcass because this process spreads the contamination and/or bacteria in it. Uncontrolled high-pressure spray could deteriorate the meat and spread the contamination. Vacuum alone is not satisfactory because it leaves some of the contamination and/or bacteria behind.

SUMMARY OF THE INVENTION

In order to understand this invention, it is stated in essentially summary form that it is directed to a carcass cleaning system which has a manually positionable wand. The wand simultaneously delivers a hot water spray within the wand and a steam spray outside the wand. The wand vacuums away the steam, its condensation products, the contamination and the hot water.

It is thus a purpose and advantage of this invention to provide a carcass cleaning system which removes the contamination from the surface of a carcass without spreading the contamination.

It is another purpose and advantage of this invention to provide a carcass cleaning system which is easily operable and which can be conveniently employed on a meat processing line to be selectively applied to the surface of the carcass to remove contamination therefrom.

It is a further purpose and advantage of this invention to provide a carcass cleaning system which effectively removes contamination from the surface of the carcass without loss of carcass material.

It is another purpose and advantage of this invention to provide a carcass cleaning system wherein the surface of the carcass in a limited area is bathed with hot water delivered from a manually positionable wand, and the carcass immediately outside the wand is bathed in steam so the wand draws away the steam condensation products, spray water and the contamination.

It is a further purpose and advantage of this invention to provide a manually controllable wand which contains a water spray and carries thereon at least one steam nozzle so that, when the wand is applied to an area of contamination on the surface of a carcass, the hot water loosens the contamination and sterilizes the adjacent surface while the vacuum nozzle draws away the water and contamination. In addition, steam is sprayed onto the carcass surface directly adjacent the wand; the steam and its condensation products are also vacuumed away by the wand.

It is a further purpose and advantage of this invention to provide a self-cleaning wand so that, as it loosens contamination on a carcass surface and sterilizes the carcass surface, the wand automatically applies sterilizing hot water to the inside surfaces and sterilizing steam to the outside surfaces of the wand itself to reduce cross-contamination from one carcass to the next.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

DESCRIPTION OF THE PREFERRED EMBODIMENT

Figure 1:
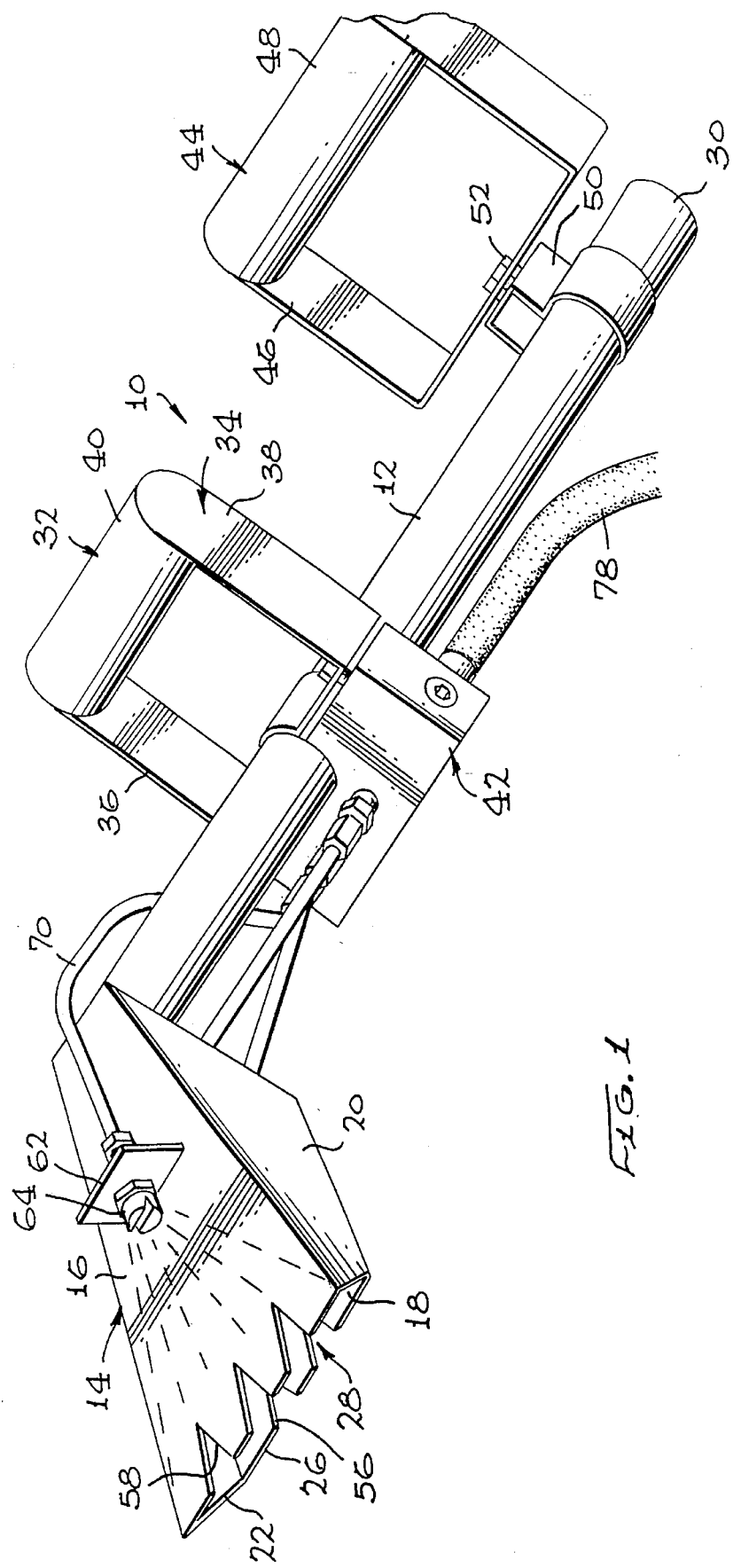
FIG. 1 is a perspective view of the manually controlled wand.
Figure 2:
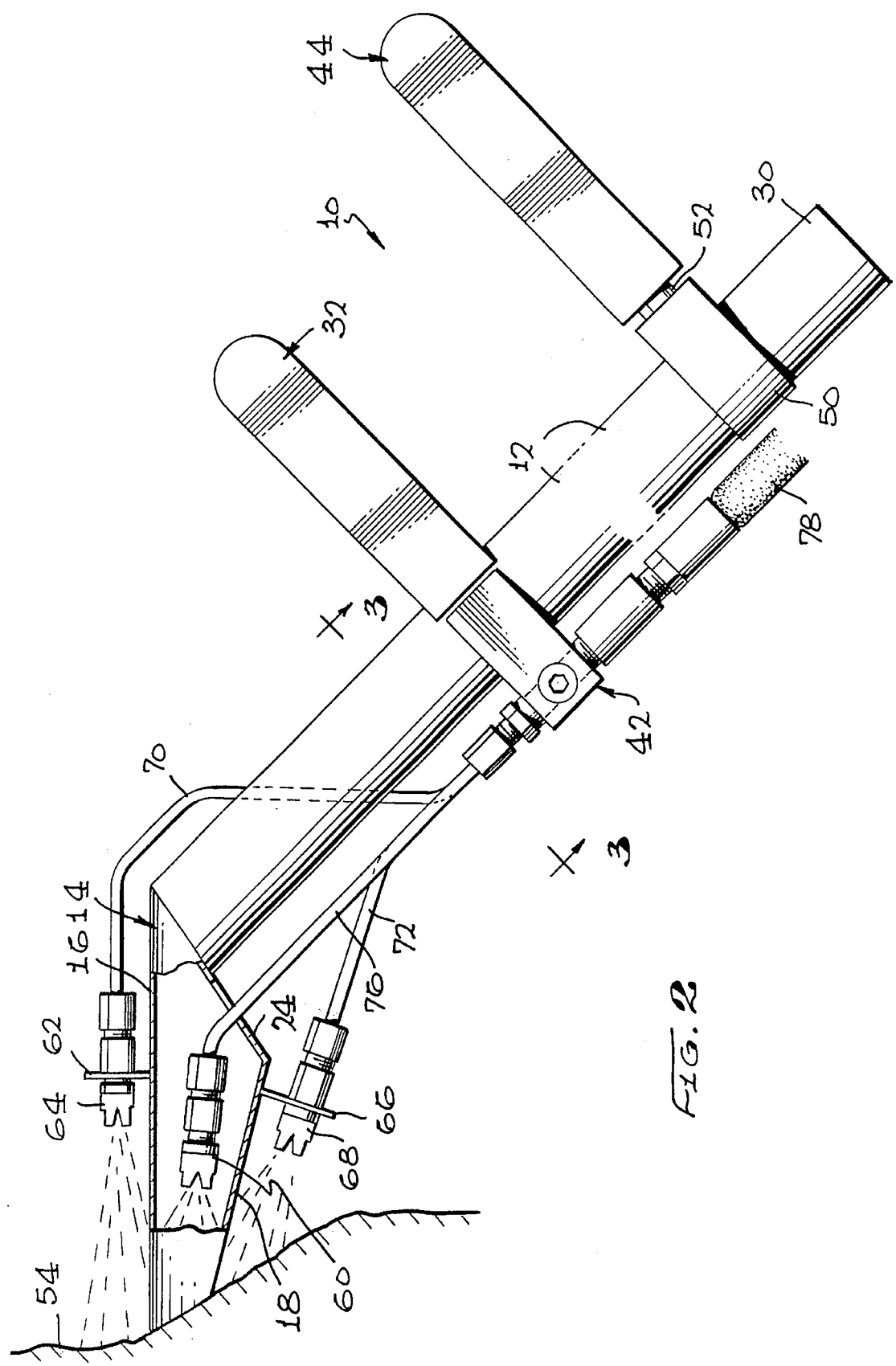
FIG. 2 is side-elevational view of the wand, with parts broken away and parts taken in section.
Figure 3:
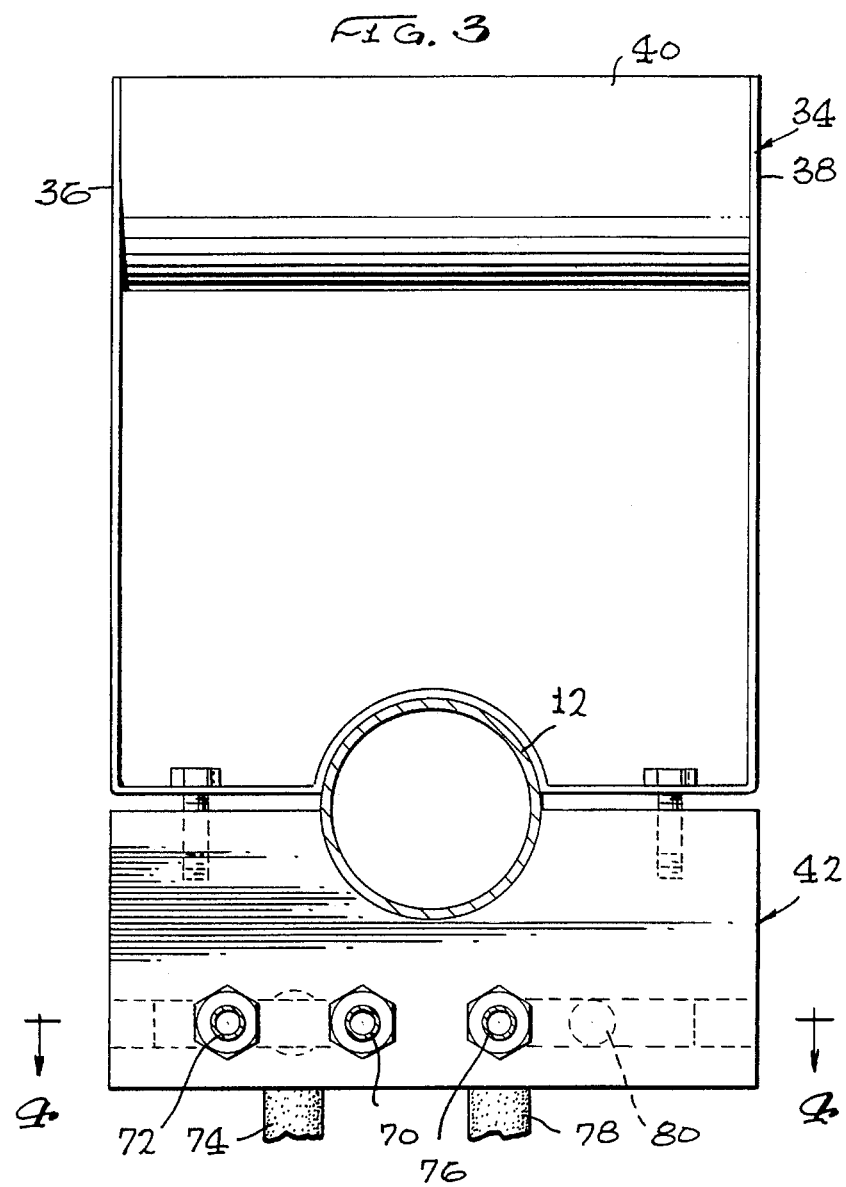
FIG. 3 is an enlarged section taken generally along line 3—3 of FIG. 2.

The carcass cleaning system of this invention includes a wand 10 shown in FIGS. 1 and 2. The wand 10 has a central member 12 which is a vacuum tube. Hood 14 is attached to the forward end of the vacuum tube and has an interior opening therebetween. The hood is made up of top and bottom walls 16 and 18, left and right side walls 20 and 22, and back wall 24. The walls are arranged so that the side walls diverge and the top and bottom walls converge to a planar front face 26, at which vacuum mouth 28 is defined. The vacuum hood 14 is configured so that, when the plane of the front face is vertical, the axis of the central member vacuum tube 12 is about 45 degrees to the vertical to provide ease of manipulation. The lower end 30 of the vacuum tube is configured for connection to a flexible vacuum hose.

In order to manually position the hood in correct position, it is provided with handles. Forward handle 32 has a U-shaped strap 34, which has side bars 36 and 38 extending upward to carry graspable handle rod 40 therebetween. Manifold block 42 is engaged under the central tube and is clamped to strap 34 to engage the tube 12 therebetween.

The rear handle 44 also has a U-shaped strap 46 between which is secured handle bar 48. Clamp 50 is clamped around the central vacuum tube 12 below the manifold 42. Strap 46 is pivotally mounted on clamp 50 on pivot pin 52 so that the handle bar 48 is rotatable on an axis substantially at a right angle to the central axis of tube 12. The handles can be positioned with respect to each other at other angles to maximize the comfort and the ease of the user. It is thus seen that the wand can be conveniently grasped and maneuvered. It can be taken to the surface 54, see FIG. 2, of a carcass which is to have its surface cleaned by the wand. It is seen that the vacuum hood might attach itself to the surface by means of the vacuum therein. In order to minimize this, a number of notches, such as notches 56 and 58 are cut in the bottom and top walls of the vacuum hood.

In order to enhance the cleaning, water spray nozzle 60 is positioned interiorly of the hood and is directed toward vacuum mouth 28. In addition, top bracket 62 carries top steam nozzle 64. Bottom bracket 66 carries bottom steam nozzle 68. The brackets 62 and 66 are respectively secured to the top and bottom walls 16 and 18 of the vacuum hood. Each of the steam nozzles is directed to deliver a fan of steam which diverges both horizontally and vertically, as seen in FIGS. 1 and 2, so that the steam is sprayed onto the carcass 54 adjacent to the hood 14, both just above and just below the hood, and also onto the top and bottom walls 16 and 18 of the hood. The notches 56 and 58 are sufficiently large and are spaced along the top and bottom walls so that the water, steam and contaminants are drawn into the vacuum hood.

Figure 4:
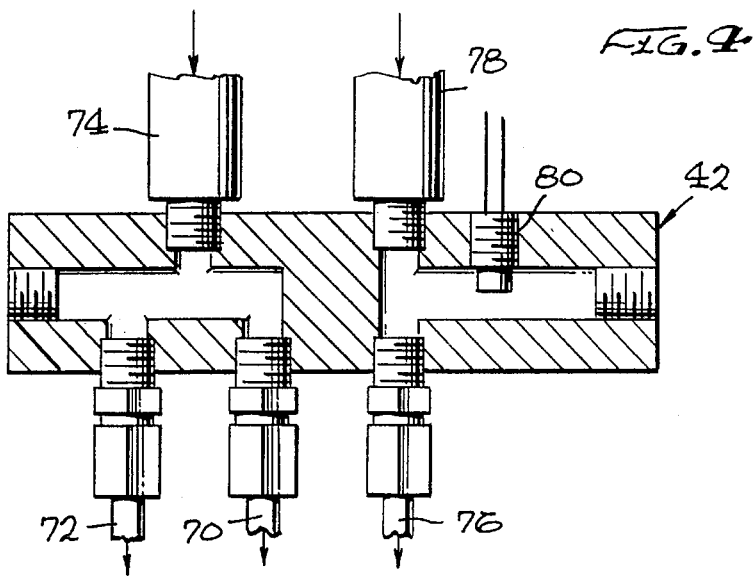
FIG. 4 is a further enlarged section taken generally along line 4—4 of FIG. 3.

Steam is supplied to the top nozzle 64 by steam line 70, and steam is supplied to the bottom nozzle 68 by means of steam line 72. These are connected to the manifold 42, as seen in FIG. 4, and steam line 74 supplies steam to the manifold.

In a similar way, hot water is delivered to nozzle 60 by means of hot water line 76. The hot water line 76 is connected through the manifold and is supplied by flexible hot water line 78. The source of these fluids can be a utility cart which supplies the necessary fluids and draws the vacuum. On the other hand, these lines can be connected through valves to steam and water lines and vacuum lines permanently installed in the factory.

A convenient way of supplying hot water is to introduce steam into the water to bring it to the desired temperature. The FDA requires a minimum hot water temperature of 180 degrees F. to assure sterilization. Thus, an automatic valve can be set to supply sufficient steam to the water flow to bring it up to about 185 degrees F. to ensure that the requirements at the surface of the carcass are met. Such automatic valves are well known. In order to assure the proper water temperature, temperature sensor 80 is fit into manifold 42, see FIG. 4, in direct contact with the flowing water. The temperature sensor can be connected to raise the water temperature should it get too low. In the typical installation, an automatic valve controls the water temperature and the temperature sensor 80 controls a steam bypass to introduce more steam to the water. The valves and connectors can be conveniently positioned on a cart which has corresponding connections to the utility lines in the facility. As examples of preferred and operative values within the indicated parameters, hot water pressure at the nozzle is 10–20 psi, depending upon nozzle shape and size, and steam pressure is 50–70 psi, depending upon steam nozzle shape and positioning.

In the normal meat processing line, an overhead conveyor continuously moves hanging carcasses past the work station. When there is sufficient volume of carcasses past the work station, there is no need to turn off the fluids to the wand. For example, the carcasses may be moving and, therefore, require cleaning at the rate of 200 carcasses per hour. The workman applies the vacuum mouth of the hood to the locations on the surface of the carcass where cleaning is desired. With the carcasses coming one after the other, shutoff is not necessary. When desired, the shutoff is accomplished by valving on the cart. The spraying of hot water interiorly of the vacuum hood and steam exteriorly of the vacuum hood sterilizes the hood between successive carcasses being cleaned, as well as during the cleaning operation itself.

This invention has been described in its presently preferred best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A carcass cleaning system comprising:

a carcass cleaning wand which can be manually maneuvered to the surface of a carcass to be cleaned of contaminants;

a hood on said wand, said hood being defined by walls, said walls defining a mouth on said hood, means for connecting said hood to a source of vacuum so that vacuum may be drawn in said hood, at least one of said walls being uneven at said mouth so that said hood does not lock onto a surface by vacuum so that vacuum in said hood draws material between said walls of said hood toward said source of vacuum;

a hot water spray nozzle within said hood, said water spray nozzle being positioned and directed so that it delivers a spray of hot water to said mouth of said hood and through said mouth for direction onto such carcass surface; and a steam nozzle attached to the exterior of said wand, said steam nozzle being positioned and directed so as to direct a stream of steam onto such carcass surface adjacent said mouth of said wand.

2. The carcass cleaning system of claim 1 wherein said hood has a top wall and a bottom wall, one of said top and bottom walls being said uneven wall and said steam nozzle is directed along said uneven wall.

3. The carcass cleaning system of claim 2 wherein said steam nozzle is a first steam nozzle and there is also a second steam nozzle, said first steam nozzle being directed along said top wall of said hood and said second steam nozzle being directed along said bottom wall of said hood so that steam from said nozzles impacts a carcass surface adjacent said mouth of said hood.

4. The carcass cleaning system of claim 3 wherein both said top and bottom walls have uneven edges thereon so that steam, water and contaminants on such carcass surface adjacent said top and bottom walls are drawn into said vacuum hood.

5. The carcass cleaning system of claim 4 wherein said uneven edge is a notched edge.

6. The carcass cleaning system of claim 2 wherein said uneven edge is a notched edge.

7. The carcass cleaning system of claim 2 further including at least one manually graspable handle secured to said wand.

8. The carcass cleaning system of claim 7 wherein there are first and second manually graspable handles secured to said wand.

9. The carcass cleaning system of claim 8 wherein at least one of said handles is adjustable with respect to said wand so that said handle can be adjusted for the user's comfort.

10. A carcass cleaning system comprising:

a wand, said wand being manually manipulatable to the selected surface of a carcass to clean the selected surface of the carcass by removing contaminants from and sterilizing such surface;

a hood on said wand, said hood having walls defining a cleaning opening in said hood;

a water spray nozzle within said hood, said water spray nozzle being positioned and directed to spray hot water out through said opening in said hood;

a steam nozzle, said steam nozzle being attached to the exterior of said hood and being positioned and directed to spray steam adjacent said opening in said hood; and means for connecting vacuum to said hood, means for connecting hot water under pressure to said water spray nozzle and means for connecting steam under pressure to said steam nozzle so that said wand can be manipulated to bring said hood adjacent such selected contaminated surface on a carcass so that water spray and steam spray wash the contamination loose and sterilize a portion of the carcass adjacent said hood and vacuum withdraws the contamination, water and steam from adjacent said hood.

11. The carcass cleaning system of claim 10 wherein said hood is defined by top and bottom walls and said steam spray is directed along one of said top and bottom walls.

12. The carcass cleaning system of claim 11 wherein there are two steam sprays, one being adjacent each of said top and bottom walls so that steam is sprayed adjacent both said top and bottom walls of said hood.

13. The carcass cleaning system of claim 12 wherein both said top and bottom walls have openings therein adjacent said mouth of said hood so that steam and contaminants are drawn into said hood adjacent both said top and bottom walls.

14. The carcass cleaning system of claim 10 wherein said steam spray is adjacent a wall defining said hood, said wall having openings therein adjacent said mouth of said hood to permit at least some of said steam to be drawn into said hood by vacuum in said hood.

15. The carcass cleaning system of claim 14 wherein there is at least one manually graspable handle on said wand to aid in manual positioning of said wand.

16. A carcass cleaning system comprising:

a wand, said wand comprising a central vacuum tube and a hood on said vacuum tube, said hood being formed of top and bottom walls as well as left and right walls to define a vacuum mouth, said walls substantially terminating in a plane, said plane being at an angle with respect to said central vacuum tube, at least one of said top and bottom walls having openings therein adjacent said mouth;

a hot water spray nozzle positioned and directed to spray hot water out of said mouth;

a steam nozzle positioned and directed to spray steam outside of said hood adjacent said mouth along said wall having openings therein; and means for connecting a flexible vacuum hose to said vacuum tube, a flexible hot water pressure hose to said water nozzle and a flexible steam pressure hose to said steam nozzle so that, when said mouth is applied to the contaminated surface of a carcass to be cleaned, hot water sprays the surface of the carcass within the bounds defined by said mouth, steam is sprayed adjacent said mouth and steam, water and contamination are vacuumed away by said hood through said vacuum tube for disposal to carry contamination, water and steam away from the surface of the carcass being cleaned.

17. The carcass cleaning system of claim 16 wherein both said top and bottom walls of said hood having openings therein and there is a steam nozzle positioned adjacent both said top and bottom walls to deliver steam adjacent both said top and bottom walls of said hood.

18. The carcass cleaning system of claim 16 wherein said steam nozzle is a first steam nozzle and said first steam nozzle is positioned on said wand to direct steam along said top wall and there is a second steam nozzle, said second steam nozzle being positioned to direct steam along said bottom wall, said openings comprising notches in both said top wall and said bottom wall adjacent said mouth of said hood.

19. The carcass cleaning system of claim 18 wherein there is a water temperature sensor adjacent said hot water nozzle so that said hot water sensor can sense and signal when the temperature of water delivered to said hot water nozzle is below a reference temperature.

20. The carcass cleaning system of claim 16 wherein there are two manually graspable handles on said central tube for grasp by the operator to position said wand, at least one of said handles being adjustable for operator comfort.

* * * * *